Patented Dec. 3, 1935

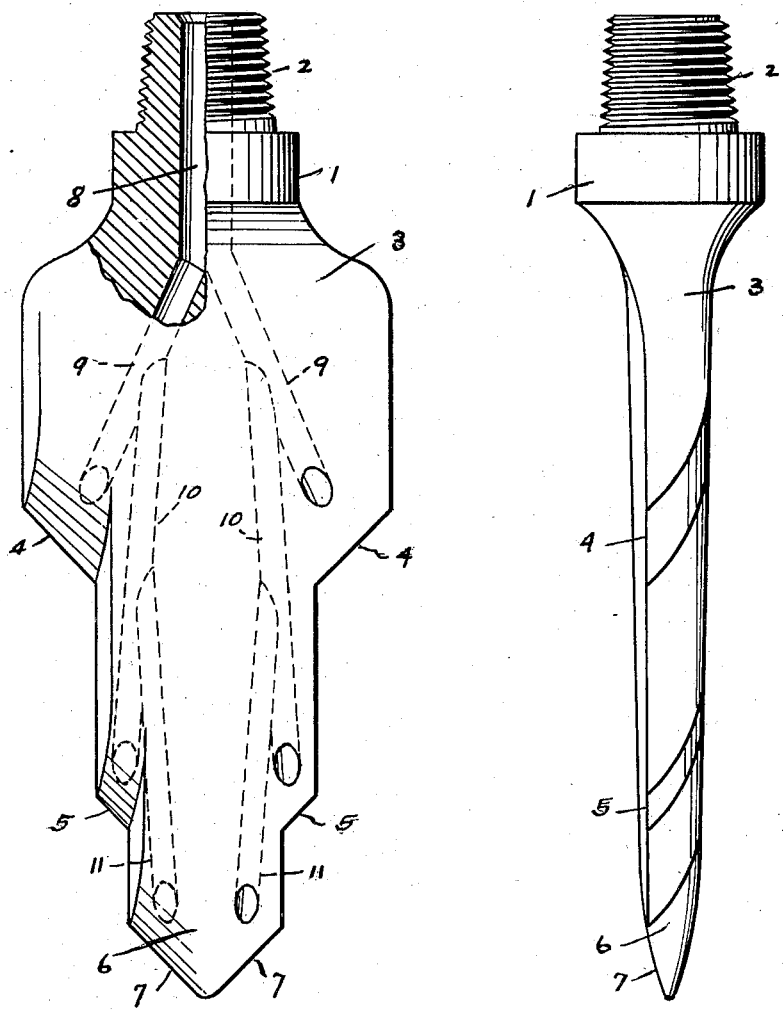

2,022,735

UNITED STATES PATENT OFFICE 2,022,735

DRILL

William L. Pearce, Houston, Tex.

Application December 10, 1934, Serial No. 756,841

2 Claims. (Cl. 255—61)

This invention relates to a reaming drill and has particular relation to a drill adapted for use for deep well drilling, and which has been particularly designed for drilling hard as well as soft formations.

An object of the invention is to provide a drill which is of such shape that it will maintain itself centered in the bore and will consequently conduce to the drilling of a comparatively straight hole.

Another object of the invention is to provide a drill of the character described that will gradually ream out and enlarge the bore as drilling progresses and which has downwardly tapering cutting edges of such form that they will conduce to a steady rotation of the drill and prevent the vibration thereof.

Another object of the invention is to provide a drill having a plurality of channels for the drilling fluid whereby the cutting edges are supplied with ample fluid for carrying away the cuttings.

With the above and other objects in view, the invention has particular relation to certain novel features of construction, arrangement of parts and use, an example of which is given in this specification and illustrated in the accompanying drawing, wherein:

Figure 1 shows a side view of the drill shown partly in section, and

Figure 2 shows an edge view thereof.

In the drawing, the numeral 1 designates the drill head which is preferably of a cylindrical form. This head has the upwardly tapering threaded pin 2 to receive the drill collar, by means of which the drill may be attached to the drill stem. Formed integrally with the head and depending therefrom is the relatively wide body 3. This body is flattened and elongated downwardly and has the downwardly tapering series of side cutters 4, 4, and 5, 5. Beneath the side cutters 4, the body is reduced in width, and beneath the side cutters 5, the body is again reduced in width, forming the pilot 6, with the downwardly tapering side cutters 7, 7. The side cutters are formed integrally with the main body of the drill, and terminate in forwardly curved cutting edges.

As shown, these cutting edges are tapered downwardly so as to gradually widen and ream out the bore as drilling progresses.

Attention is called to the advantage of tapering the side cutters downwardly. If the cutting edges of the side cutters extended at right angles to the axis of the drill, they would form abrupt shoulders on the walls of the bore and, in drilling hard formation, the drill would have a tendency to vibrate or "jump." With the cutting edges 4, 5, 7, tapering downwardly, as in the present invention, the drill will operate in the bore with wedge-like effect, and the vibration and tendency of the drill to "jump" will thus be reduced or substantially eliminated, and a straighter hole will thus be produced. An enlarged central axial bore 8 extends from the upper end of the drill down through the head 1 and at its lower end, divides into the branches 9, 9, which terminate in front of the respective side cutting edges 4, 4. These branches 9 separate, forming the downwardly extending branches 10, 10, which terminate in front of the side cutting edges 5, 5, and the branches 10, 10, further separate forming additional branches 11, 11, which terminate above and in front of the cutting edges 7, 7, of the pilot drill. Ample flushing fluid is thus supplied to the cutting edges during drilling operations to carry out the cuttings.

The drawing and description disclose what is now considered to be a preferred form of the invention by way of illustration only, while the broad principle of the invention will be defined by the appended claims.

What I claim is:—

1. A drill comprising a head whose upper end is threaded for the attachment of a driving member thereto, a flat body wider than the head and depending therefrom, said body being reduced in width beneath its upper end on each side and formed with downwardly tapering side cutting and reaming edges, and also being again reduced in width beneath said cutting edges and formed with downwardly converging side cutting and reaming edges, said body having a pilot drill at its lower end which is reduced in width and formed at its lower end with cutting edges, said drill having an axial water channel leading downwardly from its upper end and separating into branches which terminate in discharge openings above and in front of the cutting edges.

2. A drill comprising a head whose upper end is threaded for attachment of a driving member thereto, a flat body wider than the head and depending therefrom, said body being reduced in width beneath its upper end on each side and formed with downwardly tapering side cutting and reaming edges, and also being again reduced in width beneath said side cutting edges and formed downwardly converging side cutting and reaming edges, said body having a pilot drill at its lower end which is reduced in width and formed at its lower end with cutting edges, the cutting edges of said pilot converging downwardly, said drill having an axial water channel leading downwardly from its upper end and separating into branches which terminate in discharge openings above and in front of the respective cutting edges.

WILLIAM L. PEARCE.